United States Patent
Lexilus et al.

(10) Patent No.: US 12,516,453 B1
(45) Date of Patent: Jan. 6, 2026

(54) FIBROUS TEXTURE FOR A CASING MADE OF COMPOSITE MATERIAL WITH REINFORCED FLANGES

(71) Applicant: SAFRAN AIRCRAFT ENGINES, Paris (FR)

(72) Inventors: Jean-Hilaire Lexilus, Moissy-Cramayel (FR); Clément Bourolleau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 19/128,462

(22) PCT Filed: Nov. 8, 2023

(86) PCT No.: PCT/FR2023/051752
§ 371 (c)(1),
(2) Date: May 8, 2025

(87) PCT Pub. No.: WO2024/100357
PCT Pub. Date: May 16, 2024

(30) Foreign Application Priority Data

Nov. 9, 2022 (FR) ........................ 2211655

(51) Int. Cl.
*F01D 25/24* (2006.01)
*B29B 11/16* (2006.01)
(Continued)

(52) U.S. Cl.
CPC ................ *D03D 1/00* (2013.01); *B29B 11/16* (2013.01); *D03D 15/275* (2021.01);
(Continued)

(58) Field of Classification Search
CPC .......... F01D 5/282; F01D 25/24; D03D 1/00; D03D 15/275; D03D 25/005
See application file for complete search history.

(56) References Cited

U.S. PATENT DOCUMENTS

| 2020/0271015 | A1 | 8/2020 | Fabre et al. |
| 2021/0292938 | A1* | 9/2021 | Charleux ............... B29B 11/16 |
| 2021/0340881 | A1* | 11/2021 | Bourolleau ............ B29C 70/24 |

FOREIGN PATENT DOCUMENTS

| WO | WO 2021/260291 A1 | 12/2021 |
| WO | WO 2022/117938 A1 | 6/2022 |

OTHER PUBLICATIONS

International Preliminary Report on Patentability and the Written Opinion of the International Searching Authority as issued in International Patent Application No. PCT/FR2023/051752, dated Apr. 29, 2025.

(Continued)

*Primary Examiner* — Michael L Sehn
(74) *Attorney, Agent, or Firm* — Pillsbury Winthrop Shaw Pittman LLP (57) ABSTRACT

A fibrous texture having a three-dimensional weave between a plurality of layers of warp strands and a plurality of layers of weft strands. The fibrous texture includes first to fifth portions. The first and fifth portions extend in the lateral direction from the first and second lateral edges, respectively. The first and fifth portions each include warp strands composed of a first type of fiber corresponding to carbon fibers having a Young's modulus greater than 290 GPA and an elongation at break comprised between 1.2% and 2% and warp strands composed of a second type of fiber having a Young's modulus between 150 GPA and 250 GPA and an elongation at break between 4% and 6%.

9 Claims, 8 Drawing Sheets

(51) Int. Cl.
  *D03D 1/00*   (2006.01)
  *D03D 15/275*  (2021.01)
  *D03D 15/573*  (2021.01)
  *D03D 25/00*   (2006.01)
  *F04D 29/52*   (2006.01)

(52) U.S. Cl.
  CPC ......... *D03D 15/573* (2021.01); *D03D 25/005* (2013.01); *F01D 25/24* (2013.01); *F04D 29/522* (2013.01); *D10B 2101/12* (2013.01); *D10B 2401/063* (2013.01); *D10B 2505/02* (2013.01); *F05D 2220/36* (2013.01); *F05D 2240/14* (2013.01); *F05D 2300/6012* (2013.01); *F05D 2300/6034* (2013.01)

(56) References Cited

OTHER PUBLICATIONS

@Bullet: "AGY's Ultrafine E-Glass yarns Ultrafine E-Glass Yarns High Performance Yarns for IC Substrate and Multilayer PCB Applications, Product Information," Dec. 2014, XP093048816, retrieved from the Internet: URL:https :/ /www.agy.com/wp-content/ uploads/2021/12/Ultrafine_E-Glass_SheetElectronics.pdf [retrieved on May 23, 2023].

"Zylon (PBO Fiber) Technical Information (2005)", Internet Citation, Jun. 2005 (Jun. 1, 2005), XP002421336, retrieved from the Internet: URL:http://www.toyobo.co.jp/e/seihin/kc/pbo/menu/fra_meu_en.htm [retrieved on Jan. 1, 2007].

Avk: "Handbuch Faserverbundkunststoffe", Handbuch Faserverbundkunststoffe/Composites : Grundlagen, Verarbeitung, Anwendungen, Dec. 2014, XP093048945, Wiesbaden ISBN: 978-3-658-02754-4 retrieved from the Internet: URL:https :/link.springer. com/book/10.1007 /978-3-658-02755-1 [retrieved on May 23, 2023]. (with overview in English).

International Search Report as issued in International Patent Application No. PCT/FR2023/051752, dated Feb. 21, 2024.

\* cited by examiner

FIBROUS TEXTURE FOR A CASING MADE OF COMPOSITE MATERIAL WITH REINFORCED FLANGES

CROSS-REFERENCE TO RELATED APPLICATIONS

This application is the U.S. National Stage of PCT/FR2023/051752, filed Nov. 8, 2023, which in turn claims priority to French patent application number 22 11655 filed Nov. 9, 2022. The content of these applications are incorporated herein by reference in their entireties.

TECHNICAL FIELD

The invention concerns to gas turbine casings, and more particularly, but not exclusively, gas turbine fan casings for aircraft engines.

PRIOR ART

The manufacture of a composite casing starts with the production of a fibrous texture in the form of a strip, the fibrous texture being produced by three-dimensional weaving between a plurality of layers of warp yarns and a plurality of layers of weft yarns. The fibrous texture thus obtained is wound over several turns onto a mold or a tool having the shape of the casing to be produced and held between the mold and segments forming a counter-mold so as to obtain a fibrous preform.

Once the fibrous preform has been produced, i.e., at the end of winding the fibrous texture, the tooling bearing the fibrous preform is closed by counter-molds and then transported to an oven or furnace in which the preform is densified by a matrix, the matrix being especially obtained by injecting a resin into the fibrous preform and polymerizing it.

Figure 8:
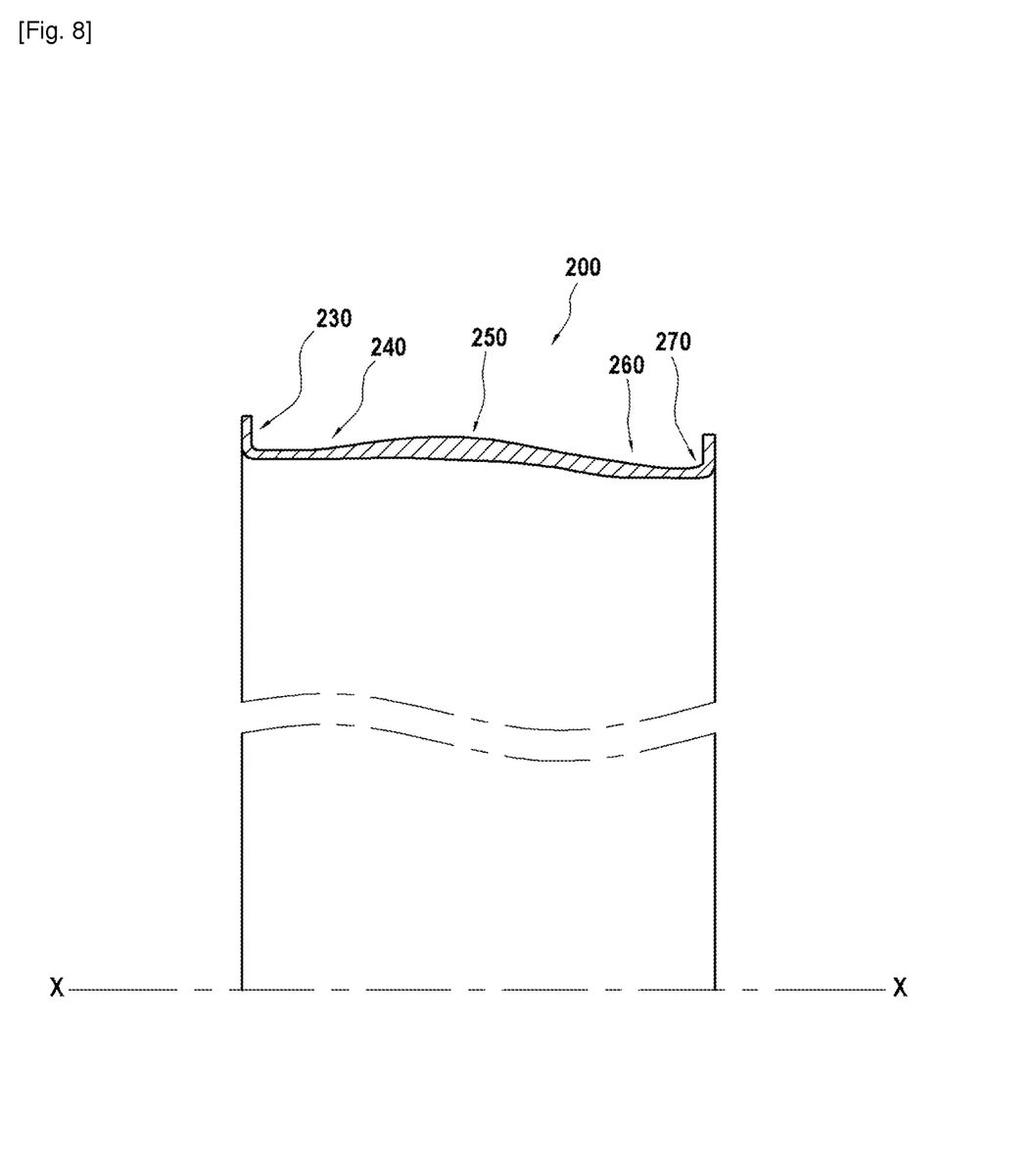
FIG. 8 is a half-view in axial section of a fan casing of an aircraft engine according to the prior art.

FIG. 8 illustrates a fan casing 200 made of composite material obtained as described above. The fan casing 200 comprises upstream and downstream flanges 230 and 270 intended to be fixed respectively to an air inlet duct and to an intermediate casing shell (not shown in FIG. 8). The casing 200 also comprises a retention zone 250 located between an upstream structural zone 240 and a downstream structural zone 260.

A fan casing performs three main functions:
ensuring the connection of engine parts to each other,
defining the air inlet section in the engine,
ensuring retention by retaining debris ingested inside the engine, or blades or blade fragments thrown by centrifugation, in order to prevent them from passing completely through the casing and high-energy debris being released.

The first two functions are not very demanding in terms of mechanical properties but are continuously active. In return, the third function, although it is used very little, is very demanding in terms of mechanical properties. For this purpose, the quantity, nature and arrangement of the fibers are defined in an optimized manner in the retention zone of the casing in order to be able to withstand an impact and retain high-energy blade fragments or objects. An example of a fan casing made of composite material with a reinforced retention zone is especially described in document US 2020/271015.

However, during a fan blade out (FBO) event, a shock wave occurs and propagates from the impact zone (retention zone) to all zones of the casing, especially the flanges. A deformation wave precedes the impact wave. In certain cases, this shock wave generates so much deformation of the casing flanges that they are strongly stressed in traction and compression, beyond the material limits. These stresses can then, in turn, generate cracks in these flanges, then propagate the crack front to unacceptable dimensions that jeopardize the mechanical integrity of the fan casing Thus, there is a need to optimize the mechanical properties of the casing flanges in order to withstand the shock wave after the impact caused by a blade out event.

DISCLOSURE OF THE INVENTION

For this purpose, the invention provides a fibrous texture having a strip shape extending in a longitudinal direction over a determined length between a proximal portion and a distal portion and in a lateral direction over a determined width between a first lateral edge and a second lateral edge, the fibrous texture having a three-dimensional weave between a plurality of layers of warp strands extending in the longitudinal direction and a plurality of layers of weft strands extending in the lateral direction, characterized in that the fibrous texture comprises first to fifth portions, each extending over the determined length of the fibrous texture in the longitudinal direction and over a determined width in the lateral direction, the first portion extending in the lateral direction from the first lateral edge, the second portion extending in the lateral direction from the first portion, the third portion extending in the lateral direction from the second portion, the fourth portion extending in the lateral direction from the third portion, the fifth portion extending in the lateral direction from the fourth portion to the second lateral edge, the first and fifth portions having a width in the lateral direction greater than the width of the second and fourth portions and less than the width of the third portion, in that the first and fifth portions each comprise warp strands composed of a first type of fiber corresponding to carbon fibers having a Young's modulus greater than 290 GPa and an elongation at break comprised between 1.2% and 2% and warp strands composed of a second type of fiber having a Young's modulus comprised between 150 GPa and 250 GPa and an elongation at break comprised between 4% and 6%, and in that the second and fourth portions each comprise warp strands composed of the first type of fiber, warp strands composed of the second type of fiber, and warp strands composed of a third type of fiber corresponding to carbon fibers having a Young's modulus greater than 250 GPa and an elongation at break comprised between 1.5% and 2.5%, the third portion comprising warp strands composed of the third type of fibers.

The fibrous texture according to the invention makes it possible to produce casings with flanges having improved mechanical properties. Indeed, the warp strands composed of the second type of fibers are predominantly present in the first and fifth portions of the fibrous texture intended to form the upstream and downstream flanges of the casing. After shaping, the fibrous texture of the invention makes it possible to form a fibrous casing reinforcement in which the portions forming the upstream and downstream flanges comprise fibers (second type of fibers) having a stiffness (Young's modulus) less than those of the other fibers (first and second type of fibers) of the reinforcement but a greater elongation at break. The flanges of the casing made of composite material comprising such a fibrous reinforcement are thus more able to withstand without deterioration the mechanical deformations imposed by the shock wave propagated after an impact on the retention zone. The idea is to have the smoothest transition possible between an all-carbon preform in the barrel and all-glass at the end of the flanges, with a gradual introduction into the preform of glass strands. A variation that is too abrupt would lead to a stress concentration and therefore a detrimental effect.

The other parts of the fibrous reinforcement intended to form the upstream and downstream structural zones and the retention zone have a greater stiffness due to the predominant presence of carbon fibers (first and second types of fibers) having a Young's modulus greater than that of fibers of the second type of fibers.

According to a particular characteristic of the fibrous texture of the invention, in the first and fifth portions of the fibrous texture, the warp strands composed of the second type of fibers are present at the lower and upper faces of the texture and at the first and second lateral edges of said texture, the warp strands composed of the first type of fibers being present in an internal part of said texture. The flanges of the casing thus have a relative flexibility on the surface, making it possible to accommodate the mechanical deformations propagating therein while maintaining a certain internal stiffness conferred by the presence of the warp strands composed of the first type of fibers in order to have a sufficient structural character.

According to another particular characteristic of the fibrous texture of the invention, the first and fifth portions comprise between 10% and 90% of warp strands composed of the second type of fibers, the remainder of the warp strands composed of the first type of fibers.

According to another particular characteristic of the fibrous texture of the invention, in the second portion of the fibrous texture, the quantity of warp strands composed of the first and second types of fibers decreases progressively between the first portion and the third portion, and in which, in the fourth portion, the quantity of warp strands composed of the first and second types of fibers decreases progressively between the fifth portion and the third portion. This makes it possible to progressively increase the stiffness of the texture and therefore of the casing from the first and fifth portions of the fibrous texture to the third portion which has the greatest stiffness due to its overall thicker geometry as well as its composition comprising only warp strands composed of the third type of fibers.

The invention also concerns an aeronautical casing fibrous preform comprising a winding of a fibrous texture according to the invention over at least one turn, the fibrous preform comprising upstream and downstream flange preform portions formed respectively by the first and fifth portions of the fibrous texture, upstream and downstream structural zone preform portions formed respectively by the second and fourth portions of the fibrous texture, and a retention zone preform portion formed by the third portion of the fibrous texture.

The invention also concerns a gas turbine casing made of a composite material, comprising a fibrous reinforcement composed of a fibrous preform according to the invention, and a matrix densifying the fibrous reinforcement. The casing may especially be a casing of a gas turbine fan.

The invention also concerns an aircraft gas turbine engine having a casing according to the invention.

The invention also concerns a method for producing a fibrous texture by three-dimensional weaving between a plurality of warp strand layers extending in a longitudinal direction and a plurality of weft strand layers extending in the lateral direction, the fibrous structure having a strip shape extending in the longitudinal direction over a predetermined length between a proximal portion and a distal portion and in the lateral direction over a predetermined width between a first lateral edge and a second lateral edge, characterized in that the method comprises weaving the first to fifth portions each extending over the predetermined length of the fibrous texture in the longitudinal direction and over a predetermined width in the lateral direction, the first portion extending in the lateral direction from the first lateral edge, the second portion extending in the lateral direction from the first portion, the third portion extending in the lateral direction from the second portion, the fourth portion extending in the lateral direction from the third portion, the fifth portion extending in the lateral direction from the fourth portion to the second lateral edge, the first and fifth portions having a width in the lateral direction greater than the width of the second and fourth portions and less than the width of the third portion, in that the first and fifth portions each comprise warp strands composed of a first type of fiber corresponding to carbon fibers having a Young's modulus greater than 290 GPA and an elongation at break comprised between 1.2% and 2% and warp strands composed of a second type of fiber having a Young's modulus comprised between 150 GPA and 250 GPA and an elongation at break comprised between 4% and 6%, and in that the second and fourth portions each comprise warp strands composed of the first type of fibers, warp strands composed of the second type of fibers, and warp strands composed of a third type of fibers corresponding to carbon fibers having a Young's modulus greater than 250 GPA and an elongation at break comprised between 1.5% and 2.5%, the third portion comprising warp strands composed of the third type of fibers.

BRIEF DESCRIPTION OF THE DRAWINGS

. 1 is a schematic perspective view of a loom showing the three-dimensional weaving of a fibrous texture.

DESCRIPTION OF THE EMBODIMENTS

The invention applies generally to fibrous textures intended for the manufacture of casings made of composite material, these casings comprising a retention zone or shield with annular flanges at their ends.

Figure 1:
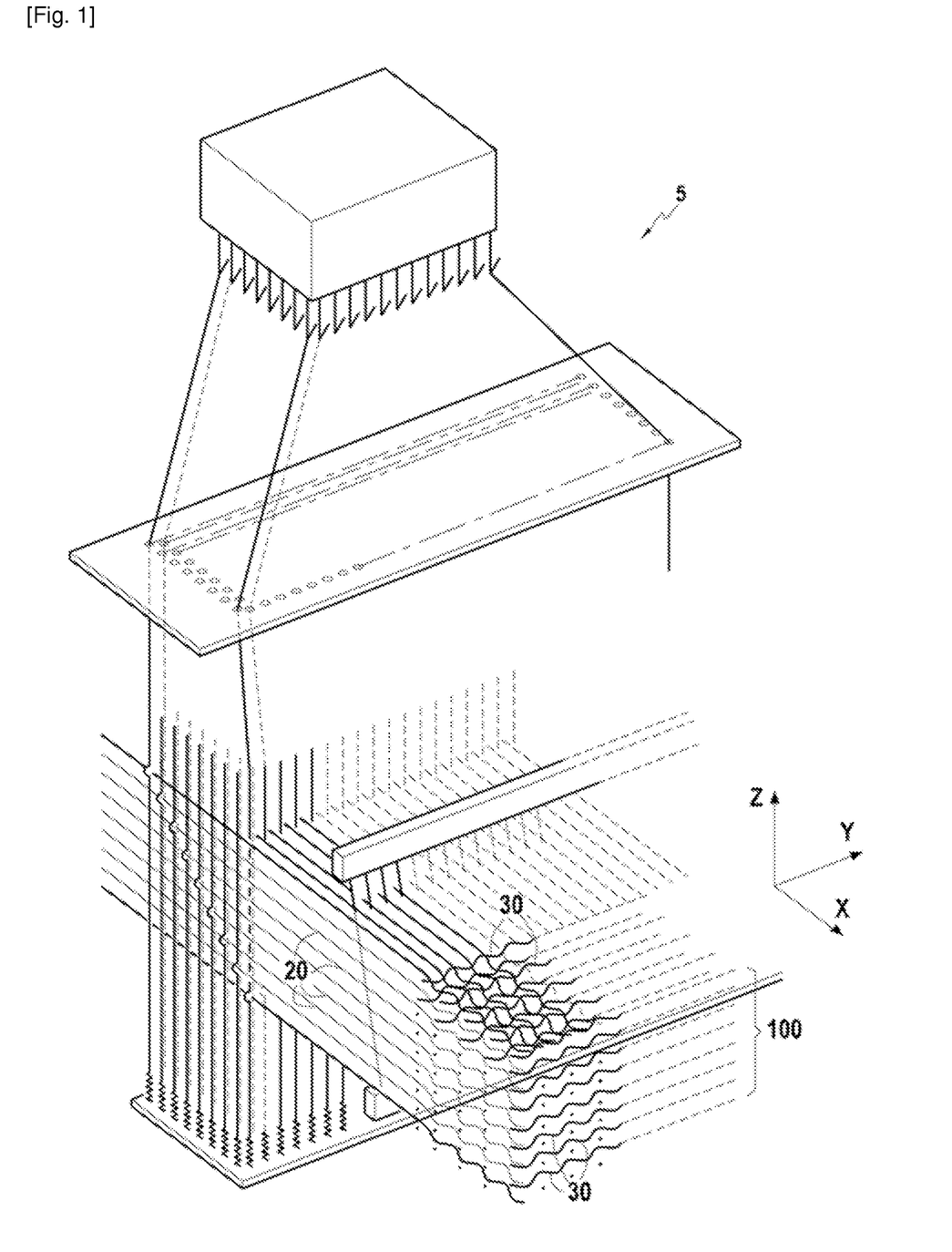

As shown in FIG. 1, a fibrous texture 100 is made in a known manner by weaving using a jacquard loom 5 on which a bundle of warp yarns or strands 20 has been placed in a plurality of layers, the warp yarns being bonded by weft yarns or strands 30.

The fibrous texture is produced by three-dimensional weaving. "Three-dimensional weaving" or "3D weaving" is understood here to mean a weaving method by which at least some of the weft yarns bind warp yarns on several warp layers, or vice versa. The fibrous texture may have an interlock weave. "Interlock" weave is understood here to mean a weaving pattern in which each layer of weft yarns binds several layers of warp yarns, with all the yarns in the same weft column having the same movement in the plane of the weave. Other weaving patterns are possible.

Figure 2:
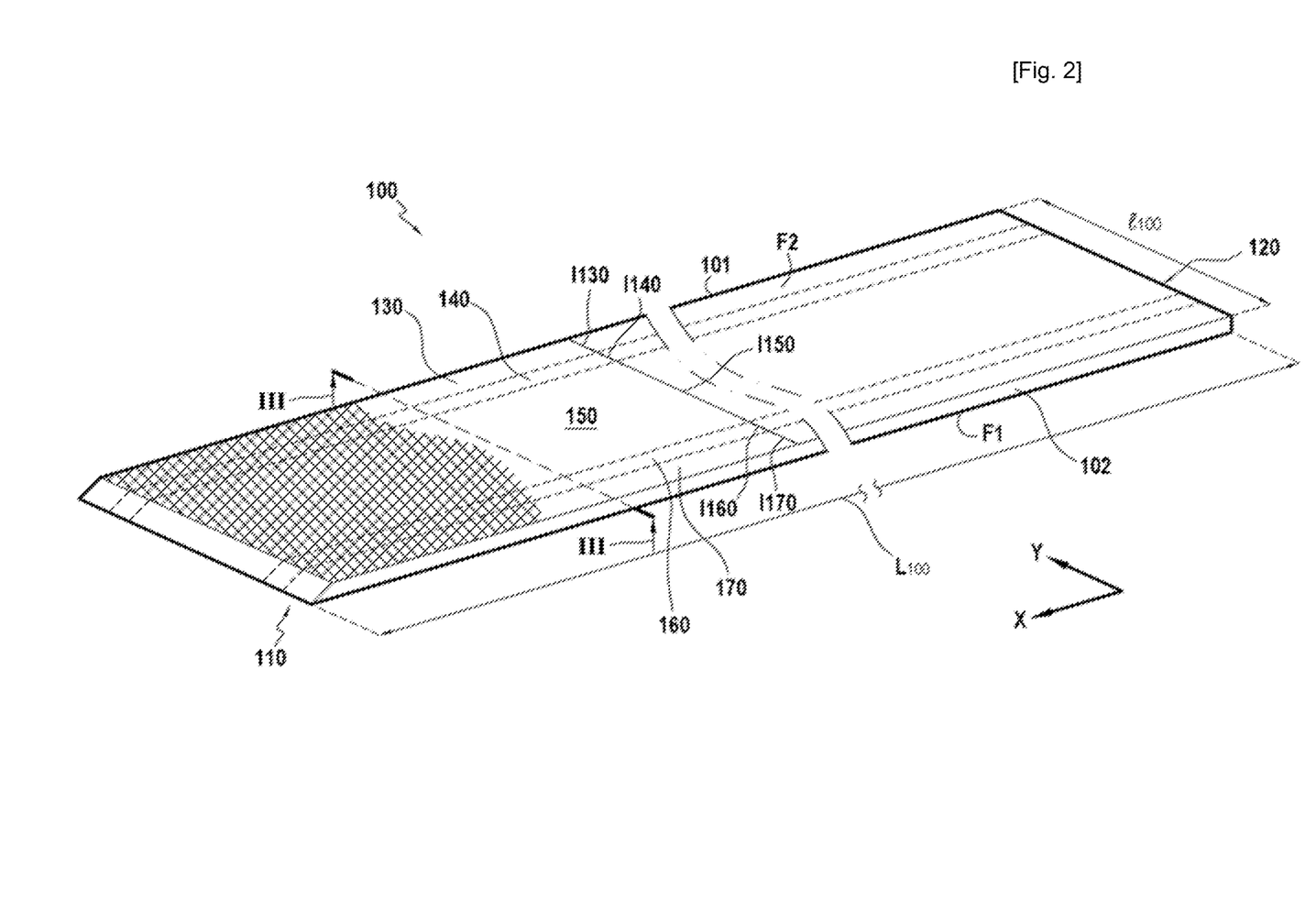
FIG. 2 is a schematic perspective view of a fibrous texture according to one embodiment of the invention.

As illustrated in FIG. 2, the fibrous texture 100 has a strip shape which extends lengthwise in a longitudinal direction X corresponding to the direction of travel of the warp yarns or strands 20 and widthwise or transversely in a lateral direction Y between a first and a second lateral edge 101 and 102, the lateral direction Y corresponding to the direction of the weft yarns or strands 30. The fibrous texture extends longitudinally over a determined length $L_{100}$ in the direction X between a proximal portion 110 intended to form the beginning of the winding of a fibrous preform on a shaping tool and a distal portion 120 intended to form the end of the winding of the fibrous preform.

The length $L_{100}$ of the fibrous texture 100 is determined as a function of the circumference of the shaping tool or mold so as to allow a determined number of turns of the fibrous texture to be made, for example four turns.

From upstream to downstream (from left to right in FIG. 2), the fibrous texture also has first to fifth portions 130, 140, 150, 160, 170 each extending over the length $L_{100}$ of the fibrous texture. The first portion 130 extends in the lateral direction Y over a determined width $I_{130}$ from the first lateral edge 101. The first portion 130 is intended to form the upstream annular flange of the casing. The second portion 140 extends in the lateral direction Y over a determined width $I_{140}$ starting from the first portion 130. The second portion 140 is intended to form part of the upstream structural zone of the casing. The third portion 150 extends in the lateral direction Y over a determined width $I_{150}$ starting from the second portion 140. The third portion 150 is intended to form the central structural zone and the retention zone or shield of the casing. The fourth portion 160 extends in the lateral direction Y over a determined width 1160 starting from the third portion 150. The fourth portion 160 is intended to form part of the downstream structural zone of the casing. The fifth portion 170 extends in the lateral direction Y over a determined width 1170 from the fourth portion 160 to the second lateral edge 102. The fifth portion 170 is intended to form the downstream annular flange of the casing.

The first and fifth portions 130 and 170 have similar widths 1130 and 1140 which are greater than the widths I140 and 1160 of the second and fourth portions 140 and 160 and less than the width 1150 of the third portion 150.

Figure 3:
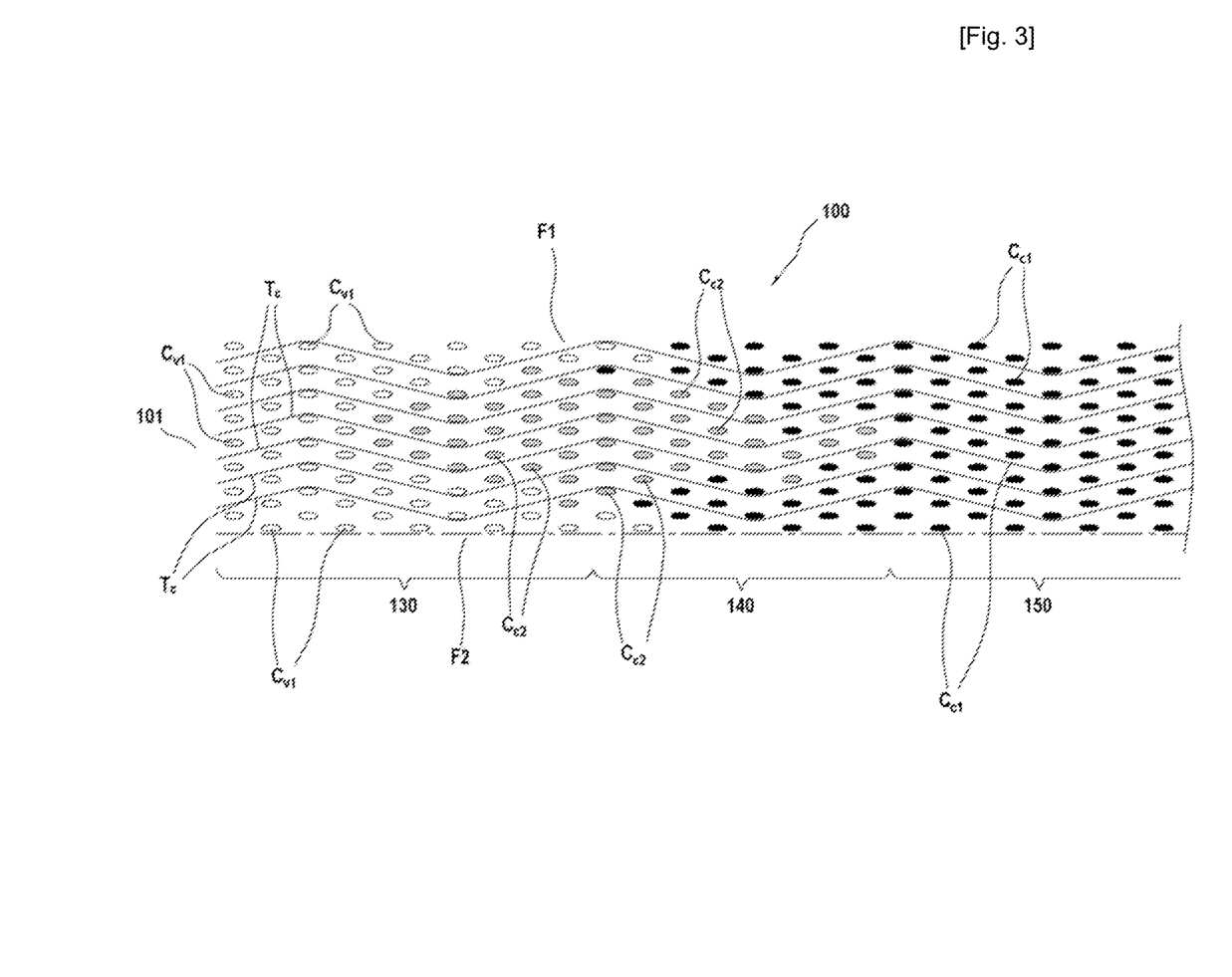
FIG. 3 is a lateral section of the fibrous texture of FIG. 2 and showing a pattern weave plane.

FIG. 3 illustrates a plane of the interlock weave pattern of the fibrous texture 100 located at the first, second and third portions 130, 140 and 150.

According to the invention, the first portion 130 comprises warp strands composed of different types of fibers. More precisely, the first portion 130 comprises warp strands $C_{C2}$ composed of a first type of fiber corresponding to carbon fibers having a Young's modulus greater than 290 GPA and an elongation at break comprised between 1.2% and 2% and warp strands $C_{V1}$ composed of a second type of fiber having a Young's modulus (E) comprised between 150 GPA and 250 GPA and an elongation at break (A) comprised between 4% and 6%. In the example described here, the warp strands $C_{V1}$ are composed of glass fibers, the glass fibers being able to be replaced, for example, by Zylon® AS and p-aramid(HM) fibers. For example, the first type of fiber can be chosen as being carbon fibers of the Tenax™ UMS40 type (E=390 GPA and A=1.2%) sold by TEIJIN and the second type of fiber can be chosen as being glass fibers of the E-GLASS type (E=165 GPA and A=4.4%) sold by AGY HOLDING CORP.

As can be seen in FIG. 3, the warp strands $C_{V1}$ composed of the second type of fiber present in the first portion 130 are preferably distributed so that the strands $C_{V1}$ are present at the lower and upper faces F1 and F2 of the fibrous texture 100 and at the first lateral edge 101 of the texture 100 which are intended to form, respectively, the radially inner and outer faces as well as the end of the upstream flange preform part. The warp strands $C_{C2}$ composed of the first type of fibers are preferably present in an internal part of said texture. The first portion 130 comprises weft strands Tc all composed of fibers of a third type of fibers corresponding to carbon fibers having a Young's modulus greater than 250 GPA and an elongation at break comprised between 1.5% and 2.5%. For example, the third type of fiber may be chosen as being carbon fibers of the HexTow® IM7 type (E=276 GPA and A=1.8%) sold by HEXCEL.

Likewise, the fifth portion 170 (not shown in FIG. 3) comprises warp strands $C_{V1}$ composed of the second type of fibers and warp strands $C_{C2}$ composed of the first type of fibers. The warp strands $C_{V1}$ composed of the second type of fiber present in the fifth portion 170 are preferably distributed so that the strands $C_{V1}$ are present at the lower and upper faces F1 and F2 of the fibrous texture 100 and the second lateral edge 102 of the texture 100 which are intended to form respectively the radially inner and outer faces and the end of the downstream flange preform part. The warp strands $C_{C2}$ composed of the first type of fibers are preferably present in an internal part of said texture. The fifth portion 170 comprises weft strands $T_C$ all composed of fibers of the third type of fibers.

The first and fifth portions 130 and 170 comprise between 10% and 90% of warp strands $C_{V1}$ composed of the second type of fibers, the remaining warp strands in these portions being composed of the first type of fibers, i.e., between 10% and 90% of warp strands $C_{C2}$.

The second portion 140 also comprises warp strands composed of different types of fibers. More precisely, the second portion 140 comprises warp strands $C_{C2}$ composed of the first type of fibers defined above, warp strands $C_{V1}$ composed of the second type of fibers defined above and warp strands $C_{C1}$ composed of the third type of fibers corresponding to carbon fibers having a Young's modulus greater than 250 GPA and an elongation at break comprised between 1.5% and 2.5%.

The warp strands $C_{V1}$ composed of the second type of fiber present in the second portion 140 are preferably distributed so that the strands $C_{V1}$ are present at the lower and upper faces F1 and F2 of the fibrous texture 100.

The quantity of warp strands $C_{V1}$ and $C_{C2}$ respectively composed of the first and second types of fibers decreases progressively between the first portion 130 and the third portion 150 in order to be progressively replaced by warp strands $C_{C1}$ composed of the third type of fibers. This makes it possible to progressively increase the stiffness of the texture and therefore of the casing from the first portion 130 of the fibrous texture 100 to the third portion 150 which has the greatest stiffness due to its overall thicker geometry as well as its composition comprising only warp strands $C_{C1}$ composed of the third type of fibers.

The second portion 140 comprises weft strands $T_C$ all composed of fibers of the third type of fibers.

Likewise, the fourth portion 160 (not shown in FIG. 3) comprises warp strands $C_{C2}$ composed of the first type of fibers, warp strands $C_{V1}$ composed of the second type of fibers and warp strands $C_{C1}$ composed of the third type of fibers. The warp strands $C_{V1}$ composed of the second type of fiber present in the fourth portion 160 are preferably distributed so that the strands $C_{V1}$ are present at the lower and upper faces F1 and F2 of the fibrous texture 100. The quantity of warp strands $C_{V1}$ and $C_{C2}$ respectively composed of the first and second types of fibers decreases progressively between the fifth portion 170 and the third portion 150 in order to be progressively replaced by warp strands $C_{C1}$ composed of the third type of fibers. This makes it possible to progressively increase the stiffness of the texture and therefore of the casing from the fifth portion 170 of the fibrous texture 100 to the third portion 150 which has the greatest stiffness due to its overall thicker geometry as well as its composition comprising only warp strands $C_{C1}$ composed of the third type of fibers. The third portion 160 comprises weft strands $T_C$ all composed of fibers of the third type of fibers.

There is therefore an evolution of the nature of the warp yarns or strands when moving along the lateral direction Y of the fibrous texture 100.

The warp strands $C_{V1}$ composed of the second type of fibers are predominantly present in the first and fifth portions 130 and 170 of the fibrous texture 100 intended to form the upstream and downstream flanges of the casing, whereas the warp strands $C_{C2}$ composed of the first type of carbon fibers and the warp strands composed of the third type of carbon fibers are predominantly present in the second, third and fourth portions 140, 150 and 160 of the fibrous texture 100 intended to form the structural zones and the retention zone of the casing. After shaping, the fibrous texture 100 of the invention makes it possible to form a fibrous casing reinforcement in which the portions forming the upstream and downstream flanges comprise fibers (second type of fibers) having a stiffness (Young's modulus) less than those of the other fibers (first and second type of fibers) of the reinforcement but a greater elongation at break. The flanges of the casing made of composite material comprising such a fibrous reinforcement are more able to withstand without deterioration the mechanical deformations imposed by the shock wave propagated after an impact on the retention zone. The other parts of the fibrous reinforcement intended to form the upstream and downstream structural zones and the retention zone have a greater stiffness due to the predominant presence of carbon fibers (first and second types of fibers) having a Young's modulus greater than that of fibers of the second type of fibers.

According to a particular characteristic of the texture of the invention, the warp strands $C_{V1}$ composed of the second type of fibers are preferably distributed in the first and fifth portions 130 and 170 of the texture 100 so that the strands $C_{V1}$ are present at the radially inner and outer faces as well as at the end of the fibrous reinforcement of the upstream and downstream flanges. The flanges thus have a relative flexibility on the surface, making it possible to accommodate the mechanical deformations propagating therein while maintaining a certain internal stiffness conferred by the presence of the warp strands $C_{C2}$ composed of the first type of fibers in order to have a sufficient structural character.

An example has just been described in which the fibrous texture has an interlock weave with 8 warp layers and 7 weft layers. However, it does not exceed the scope of the invention when the number of weft and warp layers is different, or when the fibrous texture has a weave pattern different from an interlock weave.

Figure 4:
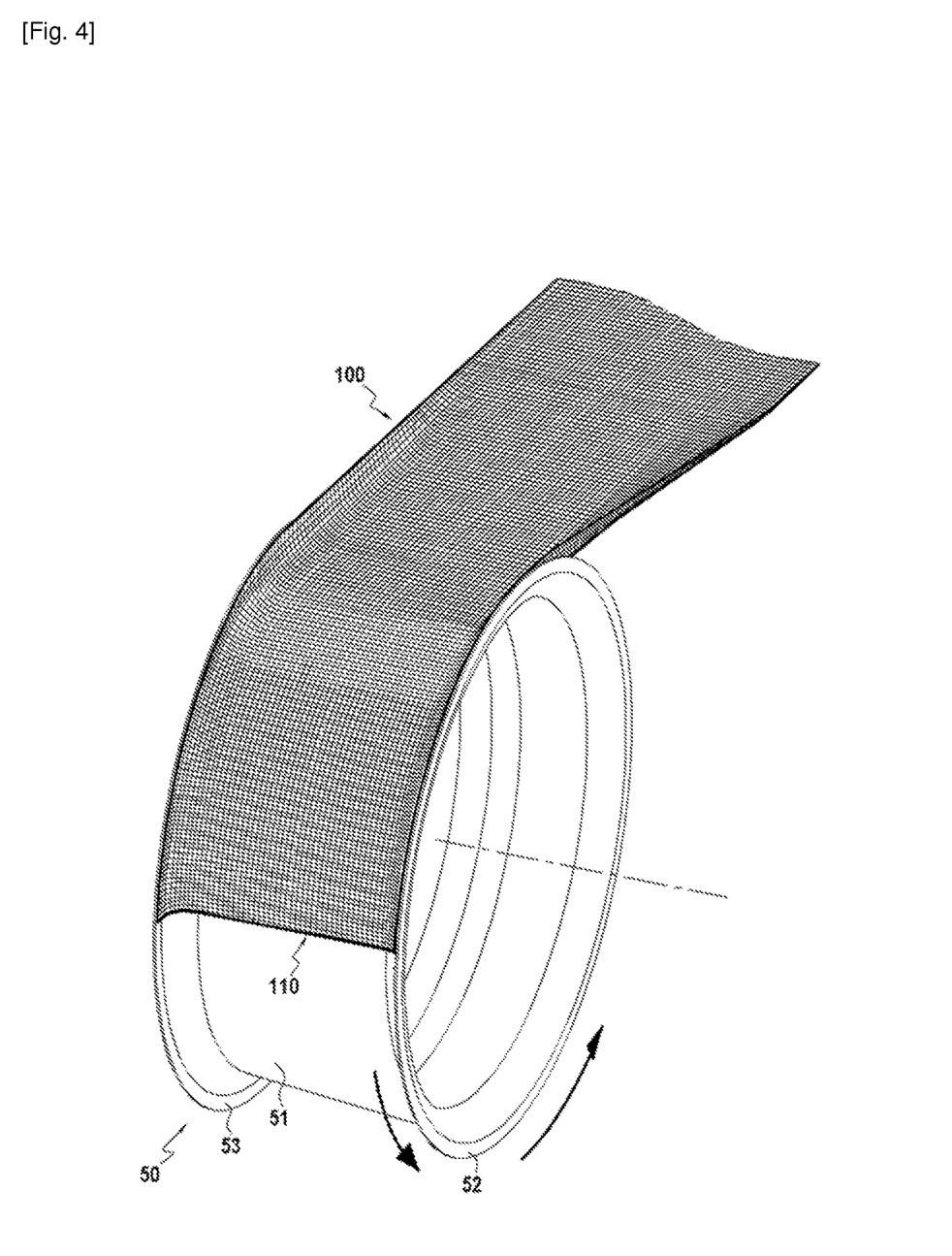
FIG. 4 a schematic perspective view showing the winding of a fibrous texture onto a shaping tool.
Figure 5:
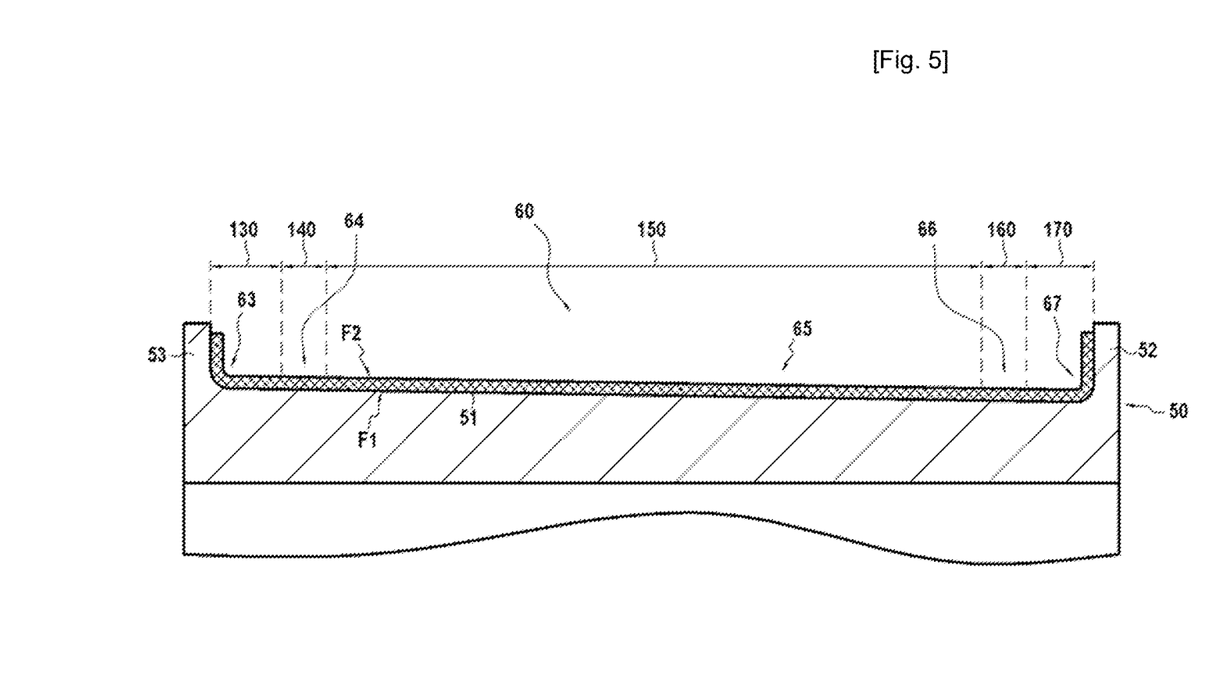
FIG. 5 is a half-view in axial section of a casing preform obtained by winding a fibrous texture as shown in FIG. 4.

As illustrated in FIG. 4, a fibrous preform 60 intended to constitute the fibrous reinforcement of the casing is formed by winding onto a mandrel 50 the fibrous texture 100 described above, the fibrous reinforcement constituting a complete tubular fibrous preform of a casing forming a single piece. To this end, the mandrel 50 has an external surface 51 whose profile corresponds to the internal surface of the casing to be created. The mandrel 50 also comprises two flanges 52 and 53 to form preform portions of upstream and downstream flanges 63 and 67 corresponding to the flanges of the casing, as illustrated in FIG. 5. The upstream and downstream flange preform portions 63 and 67 are formed respectively by the first and fifth portions 130 and 170 of the fibrous texture 100. The fibrous preform 60 further comprises preform portions of upstream and downstream structural zones 64, 66 (FIG. 5) corresponding to the upstream and downstream structural zones of the casing. The preform portions of upstream and downstream structural zones 64, 66 are formed respectively by the second and fourth portions 140 and 160 of the fibrous texture. The fibrous preform 60 also comprises a retention zone preform portion 65 intended to form the retention zone or shield of the casing. The retention zone preform portion 65 is formed by the third portion 150 of the fibrous texture.

FIG. 5 shows a sectional view of the fibrous preform 60 obtained after winding the fibrous texture 100 over at least one turn around the mandrel 50. In the example described here, the preform 60 comprises 4 turns of winding the fibrous texture 100.

The fibrous preform 60 is then densified with a matrix.

The densification of the fibrous preform consists of filling the porosity of the preform, in all or part of its volume, with the material constituting the matrix.

Figure 6:
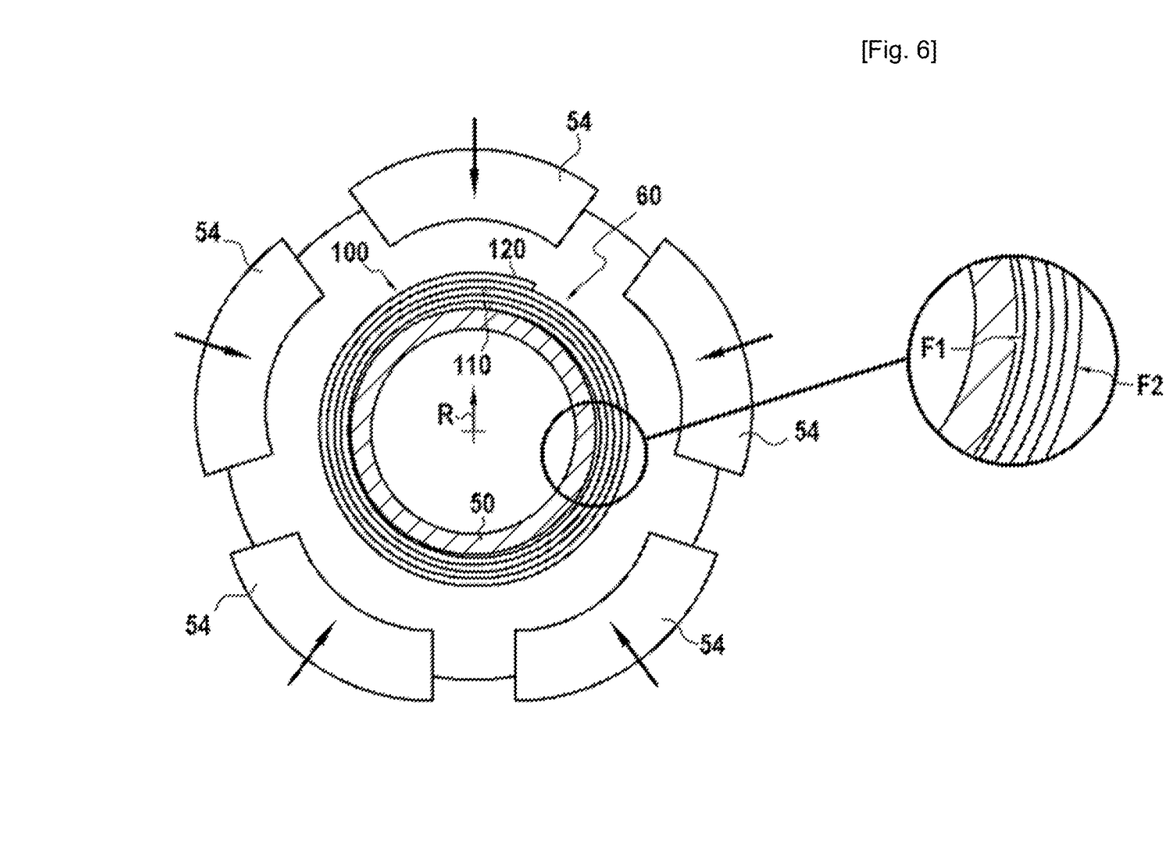
FIG. 6 is a sectional view showing the positioning of injection sectors on the casing preform of FIG. 5.

The matrix may be obtained in a manner known per se by the liquid method. The liquid method consists of impregnating the preform with a liquid composition containing an organic precursor of the matrix material. The organic precursor is usually in the form of a polymer, such as a resin, optionally diluted in a solvent. The fibrous preform is placed in a mold that can be tightly sealed with a casing in the shape of the final molded part. As illustrated in FIG. 6, the fibrous preform 60 is here placed between a plurality of sectors 54 forming a counter-mold and the mandrel 50 forming a support, these elements having, respectively, the external shape and the internal shape of the casing to be made. The liquid matrix precursor, for example a resin, is then injected into the entire casing to impregnate the preform.

The transformation of the precursor into an organic matrix, i.e., its polymerization, is carried out by heat treatment, generally by heating the mold, after removing any solvent and crosslinking the polymer, the preform still being held in the mold having a shape corresponding to that of the part to be produced. The organic matrix can especially be obtained from epoxy resins, such as, for example, commercial high-performance epoxy resin, or from liquid precursors of carbon or ceramic matrices.

The fibrous preform can be densified by the well-known resin transfer molding (RTM) method. In accordance with the RTM method, the fibrous preform is placed in a mold having the shape of the casing to be produced. A thermosetting resin is injected into the internal space delimited between the part of rigid material and the mold and which comprises the fibrous preform. A pressure gradient is generally established in this internal space between the place where the resin is injected and the evacuation orifices for the resin in order to control and optimize the impregnation of the preform by the resin.

The resin used may be, for example, an epoxy resin. Resins suitable for RTM methods are well known. They preferably have a low viscosity to facilitate their injection into the fibers. The choice of the temperature class and/or the chemical nature of the resin is determined according to the thermomechanical stresses to which the part must be subjected. Once the resin has been injected into the entire reinforcement, it is polymerized by heat treatment in accordance with the RTM method.

After injection and polymerization, the part is demolded. The part is finally cut to remove the excess resin and the chamfers are machined to obtain a casing 810 having a solid of revolution as illustrated in FIG. 7.

Figure 7:
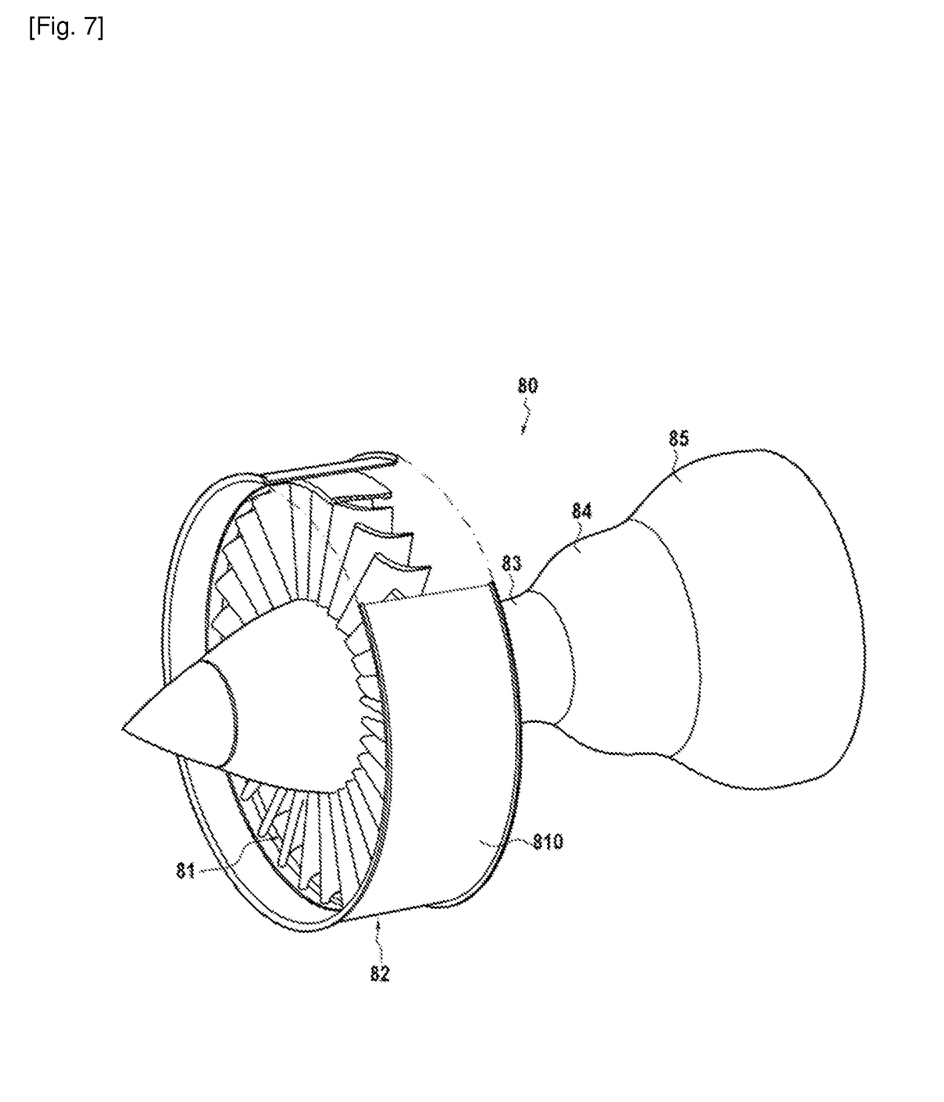
FIG. 7 is a perspective view of an aircraft engine according to one embodiment of the invention.

The casing 810 shown in FIG. 7 is a casing of a fan of an aircraft gas turbine engine 80. Such an engine, as shown very schematically in FIG. 7, comprises, from upstream to downstream in the direction of the flow of the gas stream, a fan 81 disposed at the inlet of the engine, a compressor 82, a combustion chamber 83, a high-pressure turbine 84 and a low-pressure turbine 85. The engine is housed within a casing having a plurality of portions corresponding to different elements of the engine. Thus, the fan 81 is surrounded by the casing 810.

The invention claimed is:

1. A fibrous texture having a strip shape extending in a longitudinal direction over a determined length between a proximal portion and a distal portion and in a lateral direction over a determined width between a first lateral edge and a second lateral edge, the fibrous texture having a three-dimensional weave between a plurality of layers of warp strands extending in the longitudinal direction and a plurality of layers of weft strands extending in the lateral direction, wherein the fibrous texture comprises first to fifth portions, each extending over the determined length of the fibrous texture in the longitudinal direction and over a determined width in the lateral direction, the first portion extending in the lateral direction from the first lateral edge, the second portion extending in the lateral direction from the first portion, the third portion extending in the lateral direction from the second portion, the fourth portion extending in the lateral direction from the third portion, the fifth portion extending in the lateral direction from the fourth portion to the second lateral edge, the first and fifth portions having a width in the lateral direction greater than the width of the second and fourth portions and less than the width of the third portion, wherein the first and fifth portions each comprise warp strands composed of a first type of fiber corresponding to carbon fibers having a Young's modulus greater than 290 GPa and an elongation at break comprised between 1.2% and 2% and warp strands composed of a second type of fiber having a Young's modulus comprised between 150 GPa and 250 GPa and an elongation at break comprised between 4% and 6%, and wherein the second and fourth portions each comprise warp strands composed of the first type of fiber, warp strands composed of the second type of fiber, and warp strands composed of a third type of fiber corresponding to carbon fibers having a Young's modulus greater than 250 GPa and an elongation at break comprised between 1.5% and 2.5%, the third portion comprising warp strands composed of the third type of fibers.

2. The fibrous texture according to claim 1, wherein, in the first and fifth portions, the warp strands composed of the second type of fibers are present at lower and upper faces of the texture and at the first and second lateral edges of said texture, the warp strands composed of the first type of fibers being present in an internal part of said texture.

3. The fibrous texture according to claim 1, wherein the first and fifth portions comprise between 10% and 90% of warp strands composed of the second type of fibers, the remainder of the warp strands being composed of the first type of fibers.

4. The texture according to claim 1, wherein, in the second portion of the fibrous texture, the quantity of warp strands composed of the first and second types of fibers decreases progressively between the first portion and the third portion, and in which, in the fourth portion, the quantity of warp strands composed of the first and second types of fibers decreases progressively between the fifth portion and the third portion.

5. A fibrous preform of an aeronautical casing comprising a winding of the fibrous texture according to claim 1 over at least one turn, the fibrous preform comprising upstream and downstream flange preform portions formed respectively by the first and fifth portions of the fibrous texture, upstream and downstream structural zone preform portions formed respectively by the second and fourth portions of the fibrous texture, and a preform portion of retention zone formed by the third portion of the fibrous texture.

6. A gas turbine casing made of a composite material, comprising a fibrous reinforcement composed of the fibrous preform according to claim 5, and a matrix densifying the fibrous reinforcement.

7. The casing according to claim 6 wherein said casing is a gas turbine fan casing.

8. A gas turbine aircraft engine having the casing according to claim 6.

9. A method for manufacturing a fibrous texture by three-dimensional weaving between a plurality of layers of warp strands extending in a longitudinal direction and a plurality of layers of weft strands extending in the lateral direction, the fibrous structure having a strip shape extending in the longitudinal direction over a determined length between a proximal portion and a distal portion and in the lateral direction over a determined width between a first lateral edge and a second lateral edge, the method comprising weaving the first to fifth portions each extending over the determined length of the fibrous texture in the longitudinal direction and over a determined width in the lateral direction, the first portion extending in the lateral direction from the first lateral edge, the second portion extending in the lateral direction from the first portion, the third portion extending in the lateral direction from the second portion, the fourth portion extending in the lateral direction from the third portion, the fifth portion extending in the lateral direction from the fourth portion and up to the second lateral edge, the first and fifth portions having a width in the lateral direction greater than the width of the second and fourth portions and less than the width of the third portion, wherein the first and fifth portions each comprise warp strands composed of a first type of fibers corresponding to carbon fibers having a Young's modulus greater than 290 GPa and an elongation at break comprised between 1.2% and 2% and warp strands composed of a second type of fibers having a Young's modulus comprised between 150 GPa and 250 GPa and an elongation at break comprised between 4% and 6%, and wherein the second and fourth portions each comprise warp strands composed of the first type of fibers, warp strands composed of the second type of fibers, and warp strands composed of a third type of fibers corresponding to carbon fibers having a Young's modulus greater than 250 GPa and an elongation at break comprised between 1.5% and 2.5%, the third portion comprising warp strands made of the third type of fibers.

* * * * *